United States Patent [19]

Kho

[11] Patent Number: 5,264,962
[45] Date of Patent: Nov. 23, 1993

[54] SIDEVIEW MIRROR FOR VEHICLES

[76] Inventor: Myung D. Kho, 1648, Sinlim 8-Dong Kangnam Apt. 18-40, Kwanak-ku, Seoul, Rep. of Korea

[21] Appl. No.: 932,570

[22] Filed: Aug. 20, 1992

[30] Foreign Application Priority Data

Aug. 22, 1991 [KR] Rep. of Korea ............... 13435/1991

[51] Int. Cl.$^5$ ............... G02B 7/18; B60S 1/02
[52] U.S. Cl. ............... 359/362; 359/507; 359/844; 15/250.05
[58] Field of Search ............... 359/362–367, 359/507–509, 809–871; 219/200–203, 219–220, 260–261, 438, 520–523; 15/250.001–250.003, 250.01–250.09

[56] References Cited

U.S. PATENT DOCUMENTS

| 3,712,703 | 1/1973 | Newdigate | 359/508 |
| 4,284,326 | 8/1981 | Durrer et al. | 359/509 |
| 5,134,519 | 7/1992 | Abele et al. | 359/402 |

FOREIGN PATENT DOCUMENTS

| 49111 | 11/1991 | Japan | 359/507 |

*Primary Examiner*—Bruce Y. Arnold
*Assistant Examiner*—Thong Nguyen
*Attorney, Agent, or Firm*—Beveridge, DeGrandi, Weilacher & Young

[57] ABSTRACT

A sideview mirror includes a housing having an inner tubular member and an outer tubular member. The housing has a main pipe and a branching pipe extending laterally from a center portion of the main pipe. An object lens system is arranged in a rearward portion of the main pipe, and an eye lens system is arranged in the branching pipe. A blowing device is provided in the forward portion of the main pipe. The main pipe further includes a reflecting member in its center portion to form a predetermined angle with respect to an optical axis of the eye lens system. The blowing device includes a cover plate which has through holes as air apertures and a movable plate having air apertures. The air apertures of the cover plate and the movable plate may be selectively aligned to allow air to enter the mirror. An air guider is provided to guide the entering air to the object lens system and the eye lens system. A tension spring urges the movable plate to a position which prevents air flow through the air apertures, but a driver is provided to slide the movable plate against the resilient force of the spring, thereby allowing air to flow through the apertures when they become aligned. A heater is also provided in the main pipe to heat the air coming into the air guider.

22 Claims, 4 Drawing Sheets

5,264,962

SIDEVIEW MIRROR FOR VEHICLES

BACKGROUND OF THE INVENTION

1. Field of the Invention

The present invention relates to a sideview mirror for a vehicle, and more particularly to a sideview mirror for a vehicle capable of removing water drops, moisture and frost on its eye lens and object lens using hot wind or natural wind.

2. Description of the Prior Art

Generally, a vehicle has a sideview mirror of the planar reflector type at the front bottom corner of each front side window frame, so that a driver can view the rear directly through the sideview mirror. Since such a planar reflector type of sideview mirror is exposed to the exterior, it may be exposed to water drops, moisture and frost in bad weather such as rainy or snowy weather, thereby making it difficult for the driver to view the rear. As a result, there is a danger of an accident.

Since the planar reflector type sideview mirror also has a small rear viewing angle, for example, 25°, its body should be totally protruded beyond the body of the vehicle (in the case of a passenger car, the protruded length is about 250 mm), resulting in a loss of fuel caused by an air resistance.

Furthermore, while driving at night, the light emitted from the headlights of the following vehicle is directly reflected at the sideview mirror (at the reflection factor of 50%), making the driver's view unclear. As a result, there is a problem that the conventional type sideview mirror is lacking in safety.

SUMMARY OF THE INVENTION

Therefore, an object of the invention is to eliminate the above-mentioned problems encountered in the conventional planar reflector type sideview mirrors and to provide a sideview mirror of a new lens type capable of easily removing water drops, moisture and frost therefrom.

Another object of the invention is to provide a lens type sideview mirror capable of having a large rear viewing angle and yet considerably reducing the length thereof protruded beyond the body of the vehicle, as compared with conventional planar reflector type sideview mirrors.

Another object of the invention is to a lens type sideview mirror capable of greatly reducing the reflection factor of the light emitted from the headlights of the following vehicle while driving at night.

In accordance with the present invention, these objects can be accomplished by providing a sideview mirror for a vehicle comprising: a housing comprising an inner tubular member and an outer tubular member, the housing having a main pipe arranged outwardly of the vehicle to extend longitudinally of the vehicle and a branching pipe extending laterally a center portion of the main pipe and arranged in the interior of the vehicle to look toward the driver's seat; an object lens system arranged rearwardly in the main pipe, the object lens system having at least one lens; an eye lens system arranged in the branching pipe, the eye lens system having at least one lens; blowing means arranged forwardly in the main pipe and adapted to inject natural or heated air to both the outer surface of the outermost object lens of the object lens and the outer surface of the outermost eye lens of the eye lens; and reflecting means arranged in the center portion of the main pipe at a predetermined angle with respect to the main pipe and adapted to reflect an image from the object lens system to the eye lens system.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
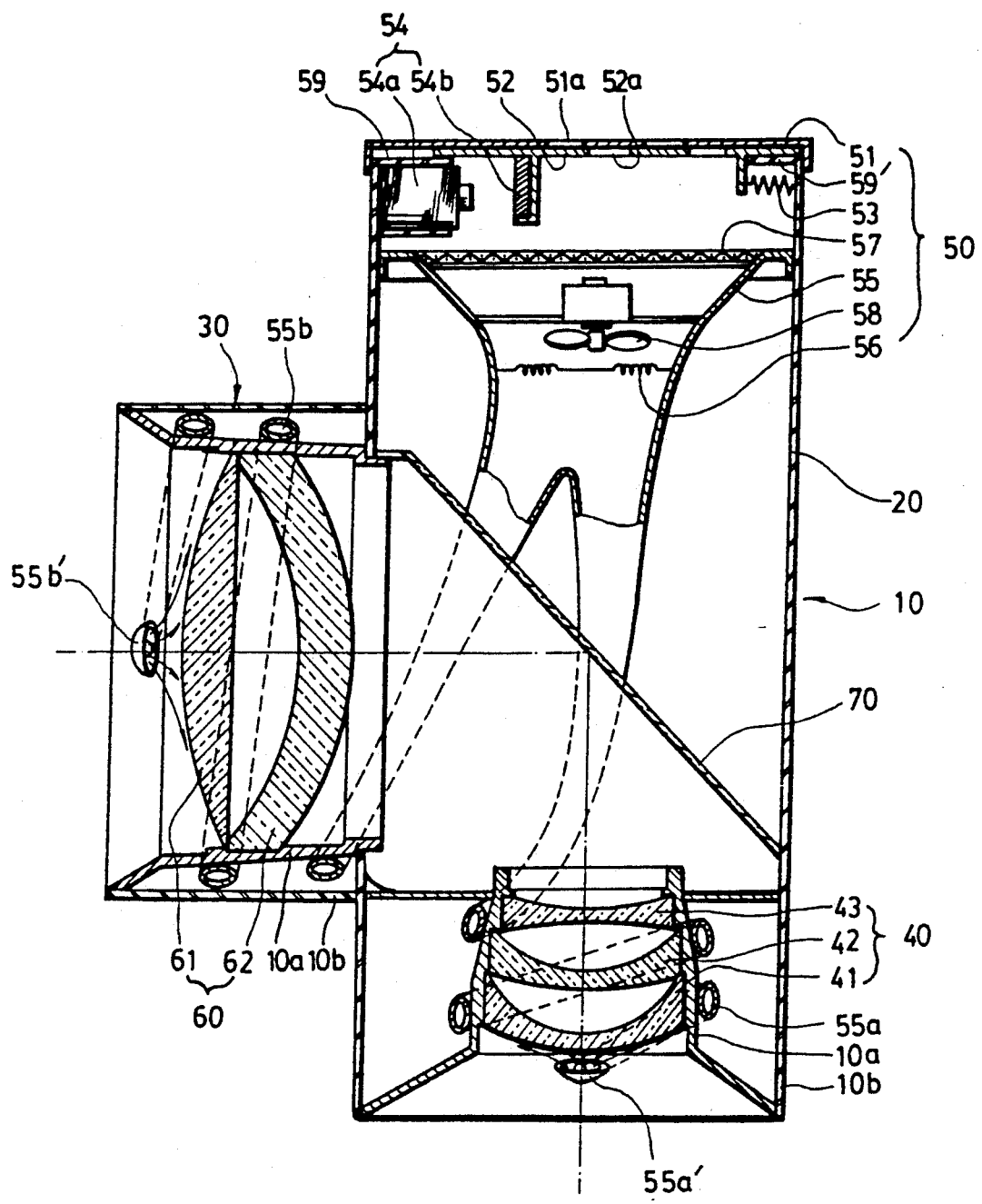
FIG. 1 is a sectional view of a sideview mirror for a vehicle in accordance with an embodiment of the present invention.

FIG. 1 is a sectional view illustrating the overall construction of a sideview mirror for a vehicle in accordance with the present invention. In FIG. 1, the reference numeral "10" denotes a hollow housing 10 comprising inner and outer tubular members 10a and 10b and having a shape of substantially a "T". The housing 10 has a main pipe 20 adapted to be arranged outwardly of the body of a vehicle and a branching pipe 30 extending from the center portion of the main pipe 20 and adapted to be arranged inwardly of the body of the vehicle.

Within the main pipe 20, an object lens system 40 and a blowing device 50 are arranged at the rear of and the front of main pipe 20, respectively.

On the other hand, an eye lens system 60 is arranged in the interior of the branching pipe 30. At the center portion, the main pipe 20 has a reflecting member 70 which is at a predetermined angle with respect to the eye lens system 60.

The object lens system 40 comprises a first convexo-concave lens 41 arranged at the rearward outermost portion of the main pipe 20, a second convexo-concave lens 42 arranged inwardly of the first convexo-concave lens 41, and a biconcave lens 43 arranged at the rearward innermost portion of the main pipe 20.

The eye lens system 60 comprises a plano-convex lens 61 arranged at the outermost portion of the branching pipe 30 and a concavo-convex lens 62 arranged inwardly of the plano-convex lens 61.

The reflecting member 70 is described and illustrated as being a planar mirror in accordance with the illustrated embodiment of the present invention, but is not limited thereto and a triangular prism may be used therefor.

On the other hand, the blowing device 50 comprises a cover plate 51 attached to the front end of the main pipe 20 and provided with a plurality of air apertures 51a, and a movable plate 52 arranged inwardly of the cover plate 51 and provided with a plurality of air apertures 52a having the same size as air apertures 51a of the cover plate 51. The movable plate 52 has opposite depending walls at both sides thereof. At one side of the movable plate 52, a resilient tension spring 53 is provided, which is attached at one end thereof to one depending wall of the movable plate 52 and at the other end thereof to the inner wall portion of housing 10 facing to the one depending wall of movable plate 52. The tension spring 53 is adapted to urge the movable plate 52 toward the above-mentioned inner wall portion of housing 10 to prevent the air apertures 52a of the movable plate 52 from aligning with the air apertures 51a of the cover plate 51. At the other side of the movable plate 52, a driver 54 is disposed which is adapted to urge the movable plate 52 toward the inner wall portion of housing 10 facing to the other depending wall of the movable plate 52, against the resilient force of tension spring 53, to make the air apertures 52a of the movable plate 52 align with the air apertures 51a of the cover plate 51, thereby enabling air to enter the housing 10. The blowing device 50 also comprises an air guider 55 adapted to guide the air entering the housing 10 to the surface of the first convexo-concave lens 41 of the object lens system 40 and the surface of the plano-convex lens 61 of the eye lens system 60. Near an inlet of the air guider 55, a heater 56 is disposed which heats the air passing through the air apertures 51a and 52a and then entering the air guider 55.

The blowing device 50 also comprises a filter 57 disposed at the front end of the air guider 55 and adapted to remove dust from the air entering the air guider 55 through the air apertures 51a and 52a.

The blowing device 50 may also include a fan 58 disposed between the filter 57 and the heater 56 to intake air forcibly while the vehicle is stopped.

The driver 54 comprises an electromagnet 54a attached to the inner wall portion of housing 10 facing to the other depending wall of movable plate 52 by means of a bracket 59, and a permanent magnet 54b attached to the other depending wall of movable plate 52.

The movable plate 52 is slidably supported and guided by a pair of brackets one of which is the bracket 59, the other being a bracket 59' fixed to the inner wall portion of housing 10 facing to the one depending wall of movable plate 52. Normally, the movable plate 52 is urged by the tension spring 53 to move toward the bracket 59' so that the air apertures 52a thereof are not permitted to align with the air apertures 51a of the cover plate 51, thereby causing them to be maintained at a closed state. If air is desired to come into the housing 10, electric power is applied to the electromagnet 54a of the driver 54 by means of a separate switch (not shown). By the electromagnet 54a cooperating with the permanent magnet 54b, the movable plate 52 is urged against the resilient force of the tension spring 53 to move away from the bracket 59', that is, in the left direction (when viewed in FIG. 1), so that the air apertures 52a thereof are permitted to align with the air apertures 51a of the cover plate 51, thereby causing them to be maintained at an opened state.

In place of the tension spring 53, other resilient means having the same function may be used.

Figure 4:
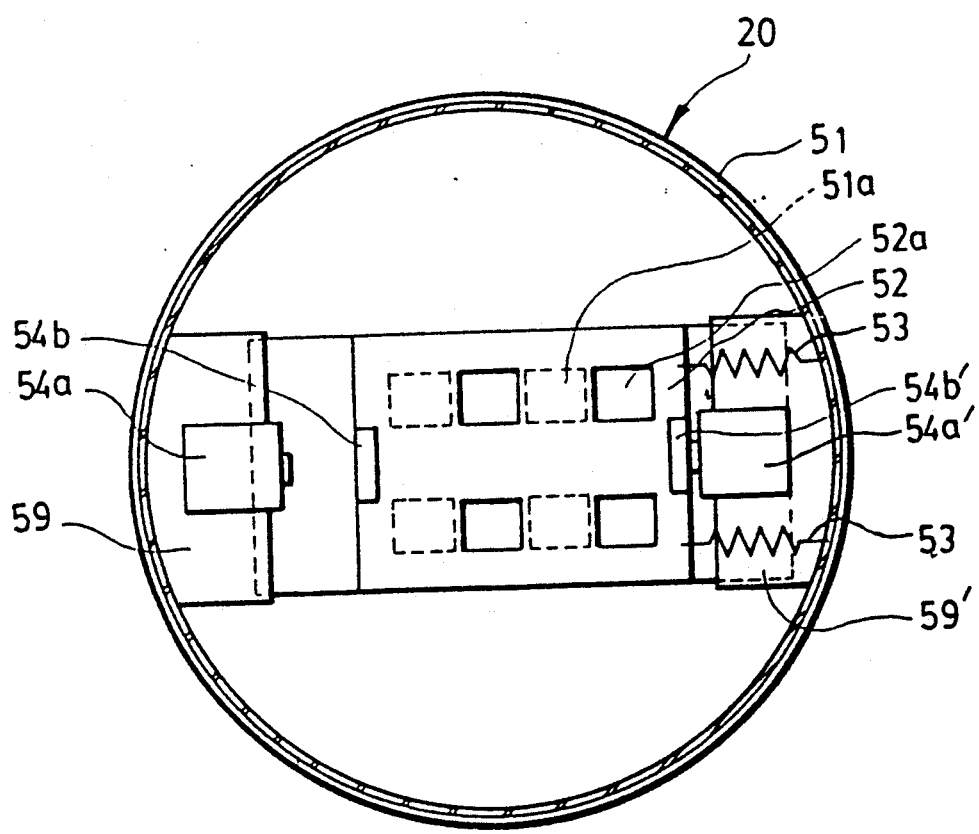
FIG. 4 is a partial plan view of a cover plate and the movable plate of the blowing device shown in FIG. 3.

Alternatively, a plurality of tension springs 53 may be used, together with an electromagnet 54a' and a permanent magnet 54b', as shown in FIG. 4.

The air guider 55 comprises a first guide tube 55a which extends through the main pipe 20 to guide air to the surface of the first convexo-concave lens 41 of the object lens system 40 and a second guide tube 55b which extends through the branching pipe 30 to guide air to the surface of the plano-convex lens 61 of the eye lens system 60.

The first and second guide tubes 55a and 55b are arranged in the form of a spiral between inner and outer tubular members 10a and 10b of the housing 10. The first and second guide tubes 55a and 55b may be provided at their ends with a nozzle 55a' and 55b' for injecting air to the surfaces of lenses 41 and 61, respectively.

The first and second guide tubes 55a and 55b may be separate tube members. Alternatively, they may be formed integrally with a space defined between inner and outer tubular members 10a and 10b of the housing 10.

The sideview mirror having the above-mentioned construction according to the present invention is mounted at the front bottom corner of each front side window frame of a vehicle such that its branching pipe 30 is disposed in the interior of the vehicle to look toward the driver's seat. The mounting of the side view mirror can be easily achieved by using a separate bracket, without changing the existing construction of vehicle.

As the electric power for driving the heater 56, the fan 58 and the electromagnet 54a, the electric power (12 V) from the battery of vehicle can be used.

The operation of the sideview mirror according to the present invention will now be described.

Figure 2:
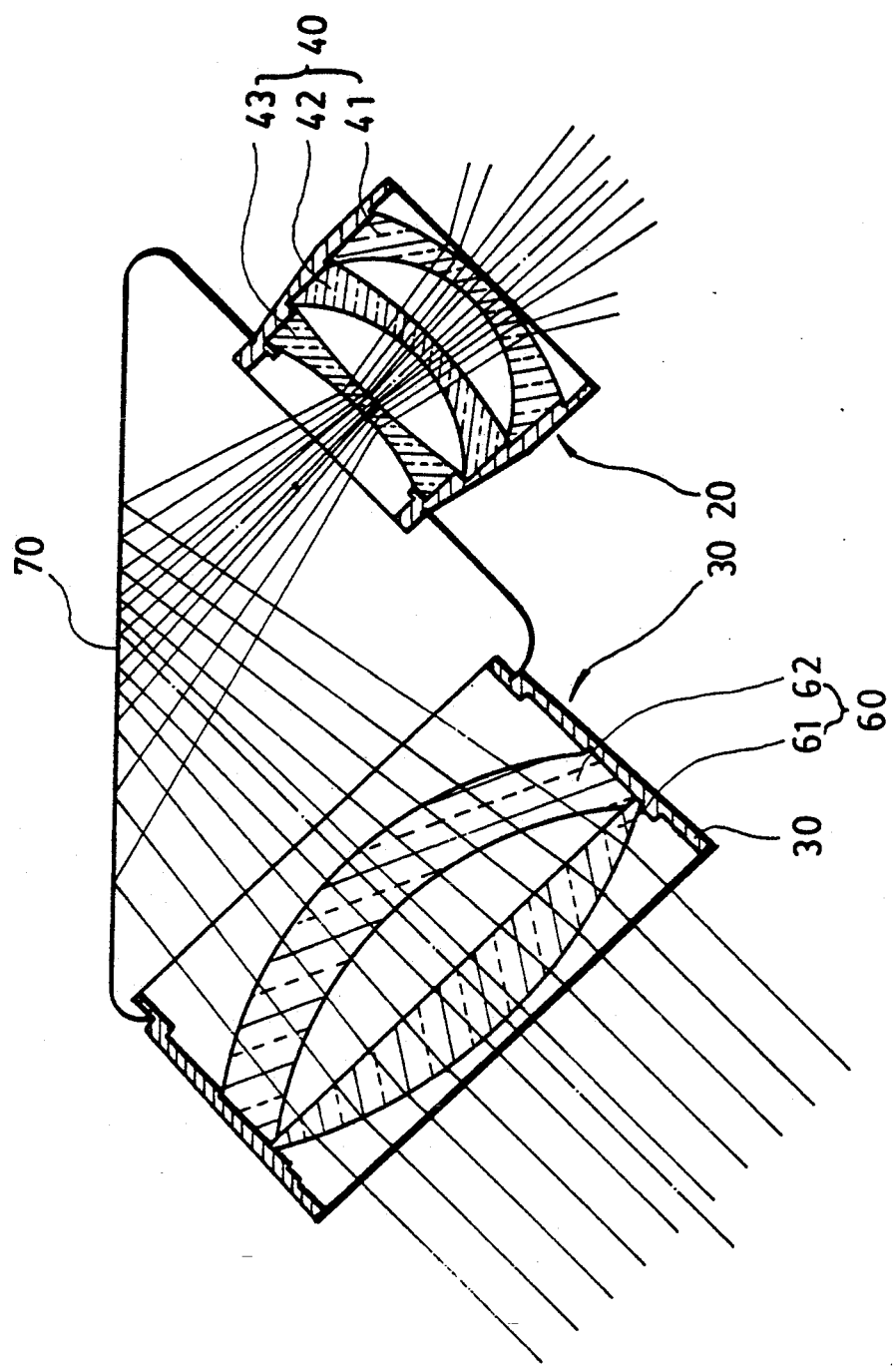
FIG. 2 is a schematic view showing a focusing state of the sideview mirror according to the embodiment of the present invention.
Figure 5:
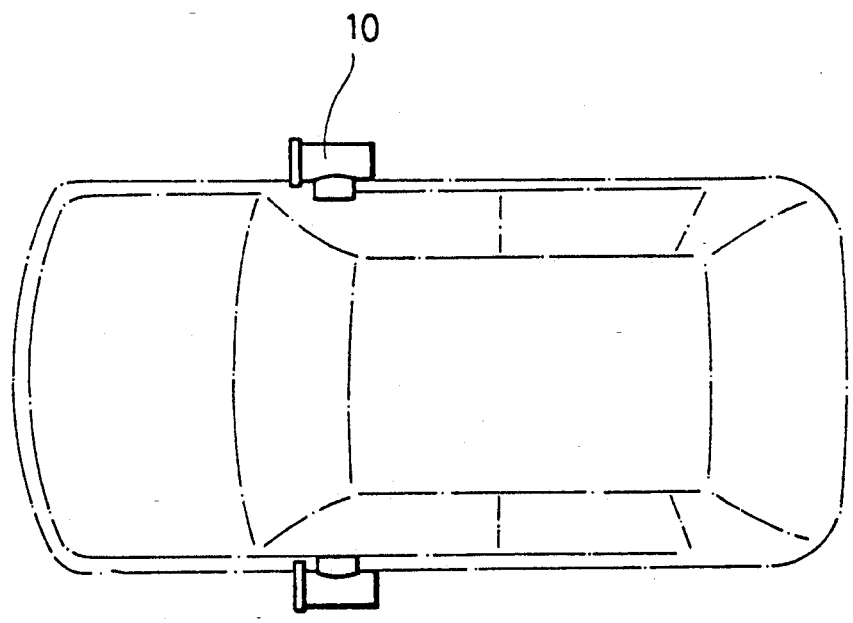
FIG. 5 is a schematic view illustrating a condition that sideview mirrors of the present invention are mounted to opposite sides of a vehicle.

Under the condition that a sideview mirror according to the present invention is mounted to each side of a vehicle, as shown in FIG. 5, an image which is indicative of the view at the rear of vehicle and is incident on the sideview mirror is reduced to a predetermined reduced scale by the first convexo-concave lens 41, the second convexo-concave lens 42 and then enlarged to a predetermined enlarged scale by the biconcave lens 43, as shown in FIG. 2. The enlarged image from the biconcave lens 43 passes through the concavo-convex lens 62 of the eye lens system 60, by the reflecting member 70 and then through the plano-convex lens 61, so that an image on a predetermined enlarged scale is obtained. That is, the beams passing through the concavo-convex lens 62 are changed into parallel beams by the plano-convex lens 61. Accordingly, the driver can see the view at the rear of vehicle through the enlarged image, by viewing the image formed on the plano-convex lens 61.

Actually, the size, namely, the enlarged scale of the image formed on the plano-convex lens 61 of the eye lens system 60 is determined by properly combining the scales of the lenses 41, 42 and 43 of the object lens system 40, so that an image on a desired enlarged scale is obtained. Accordingly, it is possible to achieve a view at a wide viewing angle and on an enlarged scale by reducing the diameter of the housing of the object lens system 40 exposed to the external area of the vehicle, that is, the diameter of the housing 10 to a minimum and yet enlarging the image on the eye lens of the eye lens system 60, that is, the image on the plano-convex lens 61 sufficiently.

Although the oriented angle of the reflecting member 70 is 45° to form an angle of 90° between main and branching pipes 20 and 30 of the housing 10 in the illustrated embodiment, it may be varied. At the oriented angle of 35°, for example, the main and branching pipes 20 and 30 of the housing 10 form an angle of 70° therebetween.

Figure 3:
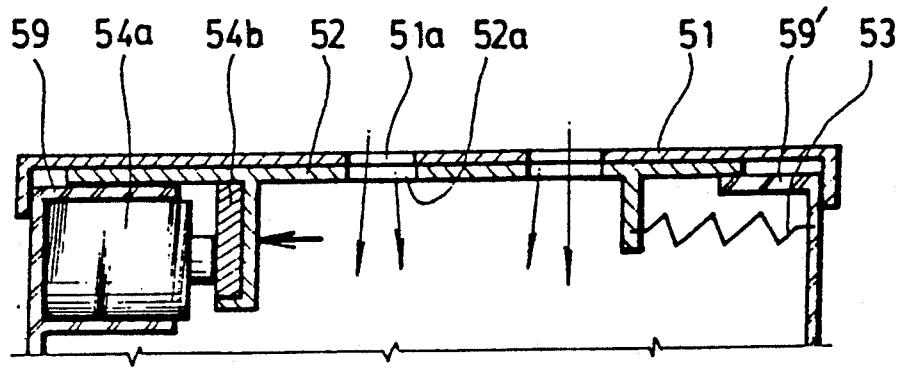
FIG. 3 is a partial sectional view showing an operation of a movable plate of a blowing device in the sideview mirror according to the embodiment of the present invention.

On the other hand, when it is required to remove water drops, moisture and frost on the convexo-concave lens 41 of the object lens system 40 or on the planoconvex lens 61 of the eye lens system 60, during driving of the vehicle, electric power is applied to the electromagnetic 54a of the driver 54 so that the electromagnet 54a is activated. By the activation of the electromagnet 54a, an attraction occurs between the electromagnet 54a and the permanent magnet 54b, thereby causing the movable plate 52 to slide away from the bracket 59' against the force of the tension spring 53. As a result, the air apertures 52a of the movable plate 52 align with the air apertures 51a of the cover plate 51 as shown in FIG. 3, thereby enabling air to enter the blowing device 50. The air which has entered the blowing device 50 is filtered through the filter 57 and then comes into the interior of the air guider 55.

By the nozzles 55a' and 55b', the coming air is injected upon the surface of convexo-concave lens 41 of the object lens system 40 and on the surface of planoconvex lens 61 of the eye lens system 60, through the first and second guide tubes 55a and 55b disposed between inner and outer tubular members 10a and 10b of the housing 10, respectively, thereby removing water drops or moisture on the surface.

Where frost or ice is formed on the lenses 41 and 61 and it cannot hardly be removed by natural wind, electric power is applied to the heater 56 to heat the coming air. As a result, hot air is generated which can easily remove the frost and ice on the lenses 41 and 61.

Even when the vehicle is stopped, the same effect as mentioned above can be obtained by operating the fan 58 under the condition of maintaining the movable plate 52 at its open position and thus forcibly flowing air through the first and second guide tubes 55a and 55b.

Since the first and second guide tubes 55a and 55b are arranged in the form of a spiral between inner and outer tubular members 10a and 10b of the housing 10, moisture which may be present between adjacent lenses can be removed by flowing hot air heated by the operation of heater 56 upon assembling the lenses or during the use thereof. Accordingly, it is possible to prevent image clarity from decreasing due to the moisture. In particular, it is unnecessary to maintain a vacuum during the assembling of lenses, thereby improving the workability upon assembling and thus reducing the manufacture cost. There is also an effect of making the maintenance easy.

Furthermore, when driving at night, the light emitted from the headlights of the following vehicle is absorbed by the object lens system and the eye lens system as it passes through the lens systems, thereby causing the amount of reflected light to decrease greatly. Accordingly, an improvement in safety is achieved when driving at night.

Although the preferred embodiment of the invention have been disclosed for illustrative purposes, those skilled in the art will appreciate that various modifications, additions and substitutions are possible, without departing from the scope and spirit of the invention as disclosed in the accompanying claims.

What is claimed is:

1. A sideview mirror for a vehicle, comprising:
    a housing including an inner tubular member and an outer tubular member, the housing having a main pipe and a branching pipe extending laterally from a center portion of the main pipe;
    an object lens system arranged in a rearward portion of the main pipe, the object lens system having at least one lens;
    an eye lens system arranged in the branching pipe, the eye lens system having at least one lens;
    blowing means arranged in a forward portion of the main pipe, wherein the blowing means includes:
        a cover plate attached to a front end of the main pipe and provided with a plurality of air apertures;
        a movable plate slidably arranged inwardly from the cover plate and provided with a plurality of air apertures selectively aligning with the air apertures of the cover plate;
        resilient means for urging the movable plate to slide in a direction so as to prevent the air apertures of the movable plate from aligning with the air apertures of the cover plate;
        driving means for sliding the movable plate against an urging force of the resilient means for aligning the air apertures of the movable plate with the air apertures of the cover plate;
        air guiding means for guiding air passing through the aligned air apertures to both a surface of an outermost lens of the object lens system and a surface of an outermost lens of the eye lens system, the air guiding means having an inlet for receiving the air; and
        a heater disposed near the inlet of the air guiding means and adapted to heat the air coming into the air guiding means; and
    reflecting means arranged in the center portion of the main pipe at a predetermined angle with respect to an optical axis of the eye lens system.

2. A sideview mirror in accordance with claim 1, wherein the object lens system comprises:
    a first convexo-concave lens arranged at a rearward outermost portion of the main pipe;
    a second convexo-concave lens arranged inwardly from the first convexo-concave lens; and
    a biconcave lens arranged at an innermost location in the rearward outermost portion of the main pipe.

3. A sideview mirror in accordance with claim 1, wherein the eye lens system comprises:
    a plano-convex lens arranged at an outermost portion of the branching pipe; and
    a concavo-convex lens arranged inwardly from the plano-convex lens.

4. A sideview mirror in accordance with claim 1, wherein the reflecting means is a planar mirror.

5. A sideview mirror in accordance with claim 1, wherein the reflecting means is a triangular prism.

6. A sideview mirror in accordance with claim 1, wherein the blowing means further comprises a filter disposed at the inlet of the air guiding means and adapted to filter the air coming into the air guiding means.

7. A sideview mirror in accordance with claim 6, wherein the blowing means further comprises a fan disposed between the filter and the heater to intake air forcibly.

8. A sideview mirror in accordance with claim 1, wherein the driving means comprises:
    an electromagnet attached to an inner wall portion of the housing; and a permanent magnet attached to the movable plate so as to face to the electromagnet.

9. A sideview mirror in accordance with claim 1, wherein the air guiding means comprises:
a first guide tube extending through the main pipe to guide air to the surface of the outermost lens of the object lens system; and
a second guide tube extending through the branching pipe to guide air to the surface of the outermost lens of the eye lens system.

10. A sideview mirror in accordance with claim 9, wherein each of the first and second air guide tubes has a nozzle at its end.

11. A sideview mirror in accordance with claim 9, wherein each of the first and second air guide tubes is arranged in the form of a spiral between the inner and outer tubular members of the housing.

12. A sideview mirror for a vehicle, comprising:
a housing including a main pipe and a branching pipe extending laterally from a center portion of the main pipe;
an object lens system arranged in the main pipe, the object lens system having at least one lens;
an eye lens system arranged in the branching pipe, the eye lens system having at least one lens;
blowing means arranged in the main pipe, wherein the blowing means includes:
a cover plate attached to the main pipe and provided with a plurality of air apertures;
a movable plate slidably arranged adjacent the cover plate and provided with a plurality of air apertures selectively aligning with the air apertures of the cover plate;
resilient means for urging the movable plate to slide in a direction so as to prevent the air apertures of the movable plate from aligning with the air apertures of the cover plate;
driving means for sliding the movable plate against an urging force of the resilient means for aligning the air apertures of the movable plate with the air apertures of the cover plate;
air guiding means for guiding air passing through the aligned air apertures to both a surface of an outermost lens of the object lens system and a surface of an outermost lens of the eye lens system, the air guiding means having an inlet for receiving the air; and
a heater adapted to heat the air coming into the air guiding means; and
reflecting means arranged in the center portion of the main pipe at a predetermined angle with respect to an optical axis of the eye lens system.

13. A sideview mirror in accordance with claim 12, wherein the object lens system further comprises:
a first convexo-concave lens arranged at a rearward outermost portion of the main pipe;
a second convexo-concave lens arranged inwardly from the first convexo-concave lens; and
a biconcave lens arranged at an innermost location in the rearward outermost portion of the main pipe.

14. A sideview mirror in accordance with claim 12, wherein the eye lens system comprises:
a plano-convex lens arranged at an outermost portion of the branching pipe; and
a concavo-convex lens arranged inwardly of the plano-convex lens.

15. A sideview mirror in accordance with claim 12, wherein the reflecting means is a planar mirror.

16. A sideview mirror in accordance with claim 12, wherein the reflecting means is a triangular prism.

17. A sideview mirror in accordance with claim 12, wherein the blowing means further comprises a filter disposed at the inlet of the air guiding means and adapted to filter the air coming into the air guiding means.

18. A sideview mirror in accordance with claim 17, wherein the blowing means further comprises a fan disposed between the filter and the heater to intake air forcibly.

19. A sideview mirror in accordance with claim 12, wherein the driving means comprises:
an electromagnet provided adjacent to an inner wall portion of the housing; and
a permanent magnet provided adjacent to the movable plate so as to face the electromagnet.

20. A sideview mirror in accordance with claim 12, wherein the air guiding means comprises:
a first guide tube extending through the main pipe to guide air to the surface of the outermost lens of the object lens system; and
a second guide tube extending through the branching pipe to guide air to the surface of the outermost lens of the eye lens system.

21. A sideview mirror in accordance with claim 20, wherein each of the first and second air guide tubes has a nozzle at its end.

22. A sideview mirror in accordance with claim 20, wherein the housing includes an inner tubular member and an outer tubular member, wherein each of the first and second air guiding tubes is arranged in the form of a spiral between the inner tubular member and the outer tubular member.

* * * * *